Dec. 19, 1933. J. B. AUSTIN 1,940,572
WELDING ELECTRODE
Original Filed Jan. 12, 1928

INVENTOR
John B. Austin
BY
Arnold C. Rood
ATTORNEY

Patented Dec. 19, 1933

1,940,572

UNITED STATES PATENT OFFICE 1,940,572

WELDING ELECTRODE

John B. Austin, Cleveland, Ohio, assignor to Una Welding, Inc., Cleveland, Ohio, a corporation of Delaware Application January 12, 1928. Serial No. 246,369
Renewed October 10, 1933

2 Claims. (Cl. 219—8)

This invention relates to the art of electric arc welding and more particularly to electrodes for use in such art.

In the welding art many types of coated or fluxed electrodes, and many electrode coating compositions have been proposed. In this application the term "deoxidizing material" will be taken to refer to material capable of deoxidizing or scavenging molten weld metal, "weld-modifying material" will be understood as referring to material other than deoxidizing material adapted to modify or improve the arc welding characteristics of an electrode or to affect or modify the nature of weld metal produced therefrom, and "fluxing materials" will be taken to include broadly either deoxidizing or weld-modifying material, or both.

Objects of this invention are to provide an electric arc welding electrode which may be employed in either hand or automatic welding and which may be economically manufactured, said electrode having advantageous arc characteristics and providing weld metal of high quality. Another object is to provide a coated electrode wherein the coating will not be substantially impaired or deteriorated by rough handling.

Other objects of the invention will be apparent to those skilled in the art from the disclosures herein made.

Figure 1:
Figure 1 is a fragmentary plan view of one form of electrode contemplated by my invention.

My invention contemplates generally a coated welding electrode which may be very economically manufactured and which may be employed with advantageous results with either hand welding or automatic welding. By my invention I provide a plurality of longitudinally and circumferentially discontinuous notches, indentations, depressions or cups in the outer or circumferential surface of the rod, which depressions or cups are to receive fluxing material comprising either deoxidizing material or weld-modifying material, or both. These indentations may be or varying depth, size and shape and may occur with varying frequency upon the surface of the rod, depending upon the proportion of flux to rod desired.

My invention further contemplates an electrode of extremely advantageous characteristics for high speed welding. Thus I have found that by associating certain deoxidizing material with a ferrous or steel rod, an electrode may be formed capable of forming solid, clean, homogeneous and non-porous weld metal of excellent mechanical properties when the electrode is melted at a high rate of speed by the use of high currents. Such deoxidizing material may be disposed on the general surface of a rod, or in rod depressions as herein described, whereby a high speed electrode capable of being employed for either hand or automatic welding may be obtained.

The rod indentations or depressions are preferably longitudinally and circumferentially discontinuous. With depressions of this character, electrodes may be subjected to considerable rough handling and bending without deterioration or loosening of fluxing material disposed in said depressions. Such depressions, moreover, are conveniently formed and filled with fluxing material in the manufacture of the electrode. Furthermore, with flux-receiving depressions of this type, the electrode may have a continuous electrically conductive surface longitudinally of the electrode, with attendant advantages, particularly for automatic welding.

The fluxing material, which may be of any suitable character depending upon the characteristics to be conferred upon the arc and/or upon the weld metal and depending in part upon the nature of the rod metal, is disposed, and preferably compressed, in the rod indentations and secured to the surface of the rod by a suitable binder. The depressions, moreover, are preferably disposed continuously of the length of the rod, and may overlap longitudinally, in order to provide fluxing material continuously to the welding flame. I prefer also that the non-depressed surface of the electrode be electrically conductive throughout the length of the rod, particularly where the electrode is to be employed in automatic welding.

The indentations or depressions may be conveniently formed in the surface of the rod by a rolling operation during the manufacture of the rod, as described in detail in my copending application entitled "Process of manufacturing welding electrode", Serial No. 376,369, filed July 6, 1929. The notched or indented rod may then be disposed in a bath containing the desired fluxing material and binder. The binder, or one of the constituents of the fluxing material, preferably acts as a good die lubricant. The rod may then be passed from such a bath through dies whereby the rod is reduced to final size and the flux compressed into the indentations during the final drawing of the rod. By passing the rod through dies from such bath, a portion of the rod surface adjacent each depression is extended partly over each depression and the fluxing material therein, thereby assisting in securely retaining said fluxing material in said depressions. There is thus produced an electrode having fluxing material disposed in the depressions, the remainder of the electrode surface being bare and electrically conductive.

My improved welding electrode may thus be formed in close conjuction with the usual wire drawing operations, and requires no expensive treatment of the rod from which the electrode is formed. It will be understood, however, that electrodes according to this invention may be formed by any suitable manufacturing operations, my electrode not being limited to any particular method of manufacture.

Figure 2:
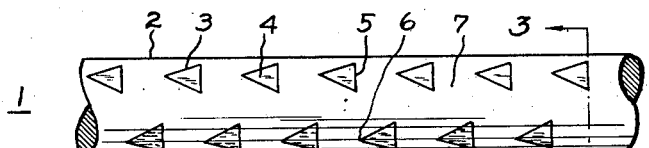
Fig. 2 is an enlarged fragmentary view of the electrode shown in Fig. 1.
Figure 3:
Fig. 3 is a sectional view taken on line 3—3 of Fig. 2.

In Fig. 1 is shown an electrode 1 according to my invention, said electrode comprising a metal rod 2 provided with the longitudinally and circumferentially discontinuous notches or depressions 3 containing the fluxing material 4. The electrode 1 is shown in enlarged form in Figs. 2 and 3. The depressions 3 are shown as of triangular shape in plan view and, as shown in Fig. 3, as of substantially triangular shape in transverse section. The depressions 3 may also be triangular in longitudinal section as indicated at 18 in Fig. 10. The depressions 3 preferably are of the shape produced by so-called "barbing" rolls, as well known in wire mill practice, the shape shown being a convenient one where the depressions are to be formed by a rolling operation.

The indentations 3 may be, of course, of any suitable shape, such as circular, rectangular, or irregular in plan view, as well as of the shape illustrated in the drawing, and may be of uniform or varying depth. The number, size and spacing of the depressions 3 will depend in part upon the amount of fluxing material to be associated with the electrode.

The depressions 3 are shown as arranged in staggered relation, the front edge 5 of each depression lying in substantially the same transverse plane as the rear edge 6 of the preceding depression, or the depressions may overlap each other longitudinally to any desire degree. By such arrangement, with the depressions disposed continuously of the length of the rod, fluxing material may be provided continuously to the welding flame during the welding operation, to provide advantageous arc welding characteristics.

It will be understood that the amount of fluxing material 4 in each depression 3 may be varied. Thus, the said depressions may be partially or completely filled with fluxing material. The fluxing material 4 preferably does not extend outwardly beyond the normal peripheral or circumferential surface of the rod 2, particularly where the electrode is to be used in automatic welding, in order that electrical contact may be readily had with the non-depressed surface 7 of the electrode 1.

Figure 4:
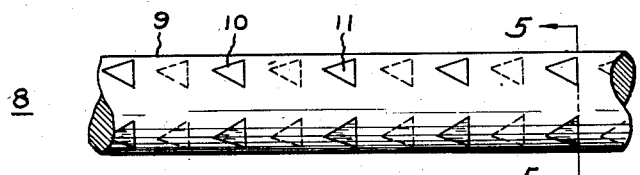
Fig. 4 is an enlarged fragmentary view of a modified form of electrode in which the indentations are staggered in pairs.
Figure 5:
Fig. 5 is a sectional view taken on line 5—5 of Fig. 4.

In Figs. 4 and 5 is shown an electrode 8 comprising a rod 9 in which are formed the depressions 10 to contain fluxing material 11. The depressions 10 are shown as staggered in pairs, and as not overlapping or continuous longitudinally. Very advantageous welding characteristics have been obtained from welding electrodes of this type, it not being always essential, particularly in hand welding, that the fluxing material be longitudinally continuous along the surface of the electrode.

Figure 6:
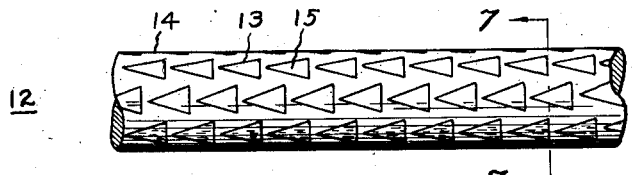
Fig. 6 is an enlarged fragmentary view of a modified form of electrode in which the indentations overlap longitudinally and are relatively numerous and close together.
Figure 7:
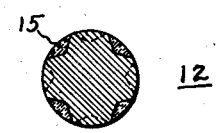
Fig. 7 is a sectional view taken on line 7—7 of Fig. 6.

In Figs. 6 and 7 is shown an electrode 12 wherein a relatively large number of depressions 13 are formed in the rod 14. The depressions 13 are shown as staggered and as overlapping longitudinally. Ordinarily, the greater the amount of fluxing material 15 to be associated with the rod 14, the closer together will be the depressions 13. The electrode 12 is advantageous in providing a continuous supply of fluxing material to the arc and forming a substantially complete envelope therefor during a welding operation.

Figure 8:
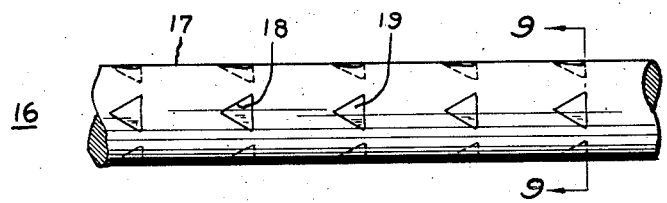
Fig. 8 is an enlarged fragmentary view of another modified form of electrode.
Figure 9:
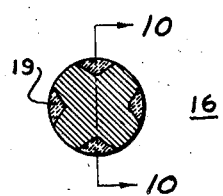
Fig. 9 is a transverse sectional view taken on line 9—9 of Fig. 8.
Figure 10:
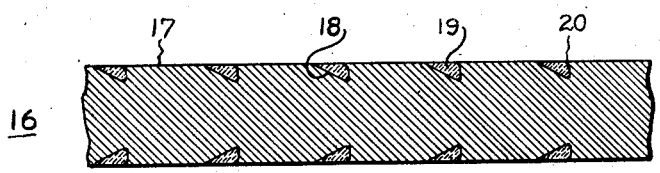
Fig. 10 is a longitudinal sectional view taken on line 10—10 of Fig. 9.

In Figs. 8, 9 and 10 is shown the electrode 16, comprising the rod 17 having formed therein the depressions 18 for the fluxing material 19. The depressions 18 are shown as arranged in circumferential groups of four, which arrangement may in certain cases prove convenient in manufacture.

In Fig. 10, it will be noted that a portion of the rod surface adjacent each depression 18 is extended partly over each said depression to form the overhanging portion 20. In other words, the depression 18 is somewhat undercut. This feature assists in securely retaining flux 19 within the depressions 18. As previously mentioned, the flux 19 may be compacted in the depressions 18 and the overhangs 20 formed in a drawing operation.

It will be understood, of course, that this invention is not limited to any particular size, shape or arrangement of the depressions in a welding electrode. Ordinarily, the greater the amount of fluxing material to be associated with the electrode, the larger will be the number, and the closer together will be the depressions.

The metal of which the rod is composed may be of any suitable kind, depending upon the material to be welded. Thus, for general steel welding, a low carbon steel rod may be employed. Obviously, of course, the composition of the rod may be varied as desired, and moreover, the rod may be of ferrous or non-ferrous metal.

The fluxing material may comprise any suitable constituents depending upon the characteristics to be conferred upon the welding arc and the weld metal. For general steel welding purposes I have found a fluxing material comprising 44 parts of talc and 7 parts of ferric oxide, each of 200 mesh or finer, to be very satisfactory. With this mixture the arc characteristics and quality of weld metal are very satisfactory, and moreover, a concave crater is formed at the end of the electrode during welding with the resulting advantage that a very short arc length may be maintained with consequent good welding characteristics and high quality of weld. However, various combinations of weld-modifying constituents may be employed with satisfactory results. It will be understood, of course, that various alloying constituents may be present in the fluxing material where it is desired to confer upon the weld metal a chemical composition different from that of the rod. In all cases, the fluxing material is preferably in finely comminuted form.

Where the electrode is to be used for high speed welding, the fluxing material, as described in my copending application entitled "Welding electrode", Serial No. 246,172 filed January 12, 1928, and since matured into Patent No. 1,882,311 of October 11, 1932, preferably comprises titanium in the form of a metallic deoxidizer together with a diluent material. Thus, the flux may comprise, for example, 25 parts by weight of ferro-titanium of 200 mesh, and 75 parts by weight of talc of 200 mesh. Sufficient aqueous silicate of soda may then be associated with the aforementioned materials to form a paste. The amount of the above-mentioned flux associated with the metal rod is preferably such that the percentage of titanium with respect to the weight of the electrode will be within the limits of about 0.05 to 2.0%. With a steel rod having a coating of the above mentioned character, an electrode is formed which may be melted at a very rapid rate, the electrode providing a stable arc and excellent arc characteristics in general when melted under high currents. With this electrode, moreover, the metal of the electrode may be transferred across the arc to the metal to be welded with a very low metal loss due to sputtering and the like. The metal deposited at a high rate from this electrode, furthermore, is solid, homogeneous, and substantially free from oxides, porosity, and burnt characteristics in general, and splendid penetration is obtained. Moreover, the slag formed from this electrode is inappreciable in amount.

Any suitable binder may be employed to cause fluxing material to adhere to the surface of the steel. Thus, lacquer, shellac, varnish, or similar substances might be employed. I have found, however, that an aqueous solution of sodium silicate is very satisfactory for this purpose. Sodium silicate besides being a satisfactory binder, also confers certain desirable welding characteristics to the arc. Moreover, when the rod is disposed in a bath of the fluxing material and then drawn through a die, the sodium silicate acts as a very satisfactory die lubricant. A satisfactory fluxing material bath may thus comprise in percentages by weight, 44% calcium carbonate, 7% ferric oxide, 22% commercial silicate of soda and 27% water.

It will be understood, of course, that electrodes according to this invention may be utilized with either carbon arc or metal arc welding or with gas welding.

It will thus be seen that I have provided an arc welding electrode having very desirable arc welding characteristics, which may be economically manufactured, and which forms high quality weld metal of non-porous, homogeneous character.

It will further be seen that I have provided a flux coated electrode having a continuous electrically conductive surface longitudinally of the electrode whereby the electrode may be readily employed for automatic welding, in which electrode fluxing material will adhere to the surface thereof even under rough handling, bending, etc.

It will moreover be noted that I have provided an electrode of uniform welding characteristics having a mechanically prepared surface whereby fluxing material in predetermined amounts may be caused to adhere with great permanence directly to the dense metallic surface of the rod, in which electrode flux may be disposed in depressions in the surface of the metal rod, which depressions may be shaped to assist in retaining said flux.

Furthermore, it is to be understood that the particular forms of the articles shown and described, and the particular procedure set forth, are presented for purposes of explanation and illustration and that various modifications of said apparatus and procedure can be made without departing from my invention as defined in the appended claims.

What I claim is:

1. A welding electrode comprising a metal rod, the surface of said rod being provided with a plurality of longitudinally and circumferentially spaced depressions, fluxing material disposed in said depressions, a portion of the rod surface adjacent each depression extending partly over each depression and the fluxing material therein, whereby said fluxing material may be securely retained with said depressions, the non-depressed portion of said electrode being electrically conductive and substantially bare.

2. A welding electrode comprising a metal rod, the surface of said rod being provided with a plurality of longitudinally and circumferentially spaced depressions, each of said depressions having inwardly extending walls joining below the surface of the rod to form a substantially V-shaped depression and fluxing material disposed in each of said depressions, a portion of the rod surface adjacent each depression extending partly over said depression and the fluxing material therein to assist in retaining the fluxing material within the depression, the non-depressed portion of said rod being electrically conductive and substantially bare.

JOHN B. AUSTIN.